United States Patent [19]

Warwick et al.

[11] Patent Number: 4,937,438
[45] Date of Patent: Jun. 26, 1990

[54] MAGNETIC ENCODING APPARATUS AND METHOD

[75] Inventors: Dennis J. Warwick, Richfield; Ronald B. Howes, Jr., Minneapolis, both of Minn.

[73] Assignee: DataCard Corporation, Minneapolis, Minn.

[21] Appl. No.: 276,232

[22] Filed: Nov. 23, 1988

[51] Int. Cl.⁵ .............................................. G06F 7/08
[52] U.S. Cl. ..................................... 235/446; 235/479
[58] Field of Search ................................. 235/449, 479

[56] References Cited

U.S. PATENT DOCUMENTS

| | | |
|---|---|---|
| 3,820,455 | 6/1974 | Hencley et al. |
| 3,893,182 | 7/1975 | Schmidt |
| 3,940,796 | 2/1976 | Haun et al. |
| 3,976,858 | 8/1976 | Haun |
| 4,028,734 | 6/1977 | Mos |
| 4,040,097 | 8/1977 | Mizuno |
| 4,040,108 | 8/1977 | Nakata |
| 4,057,011 | 11/1977 | Tramposch et al. |
| 4,259,699 | 3/1981 | Yoshida |
| 4,304,992 | 12/1981 | Kobayashi et al. |
| 4,476,507 | 10/1984 | Koike et al. |
| 4,518,853 | 5/1985 | Gabel et al. |
| 4,585,929 | 4/1986 | Brown et al. |
| 4,593,328 | 6/1986 | Baus, Jr. |
| 4,598,479 | 7/1986 | Baus |
| 4,616,128 | 10/1986 | Case |
| 4,626,670 | 12/1986 | Miller |
| 4,692,602 | 9/1987 | Conant |
| 4,742,213 | 5/1988 | Conant |
| 4,833,310 | 5/1989 | Shimamura ........................ 235/479 |

Primary Examiner—Harold I. Pitts
Attorney, Agent, or Firm—Merchant, Gould, Smith, Edell, Welter & Schmidt

[57] ABSTRACT

A magnetic stripe encoding apparatus (24) encodes information onto a magnetic stripe (22) of a card (20). A card carriage (26) moves the card (20) along a card transport path between a top rail (28) and a bottom rail (30). The magnetic stripe (22) passes an encoding write head (36) and a read head (40) for writing and verifying information on the stripe (22). Heads (36, 40) mount on a bracket (44) which allows only twisting motion and movement toward and away from the card (20) so that good contact is maintained between the magnetic stripe (22) and the heads (36, 40). One embodiment of the card carriage (26) includes spring biased pawls (60, 62) which are biased into the card transport path for engaging the card (20) and rotate away from the card transport path so that the pawls 60,62 do not engage the card (20).

27 Claims, 9 Drawing Sheets

MAGNETIC ENCODING APPARATUS AND METHOD

BACKGROUND OF THE INVENTION

The present invention relates to a magnetic encoding apparatus for encoding information onto a magnetic stripe of a plastic card such as a credit card, an automatic teller machine card, or other sheet material such as fare tickets or passbooks. The magnetic stripe encoding is typically performed along with other card processing operations such as embossing or graphics applications.

Magnetic encoded stripes are widely used on credit cards and other cards. Mechanisms for encoding information onto the magnetic stripes are well known in the field. Such a mechanism is disclosed in U.S. Pat. No. 4,518,853 to Gabel et al. The Gabel et al. patent discloses an encoding apparatus in which a tiltable carriage moves the card along a transport path past an encoding apparatus. The Gabel et al. patent uses pinch rollers to exit the card from the mechanism and also includes a tiltable plate which opens to remove defective cards.

The pinch rollers used in the Gabel patent to exit the card from the encoding mechanism have the possibility of marking cards and may slip due to wear and the accumulation of debris around the periphery of the rollers. Verification is performed by the same encoding head requiring the motor and carriage to reverse so that the card can be backed up and passed by the head again. This reversal and second passage requires additional time and decreases throughput rates.

Prior devices for mounting magnetic heads so that the face of the head follows a card surface are unsatisfactory. Such a mounting device is disclosed in U.S. Pat. No. 4,585,929 to Brown et al. The Brown et al. patent discloses a mounting bracket which swivels and moves toward and away from a card to follow a card surface. The head mounts in a bracket which in turn mounts on a rotatable shaft requiring bearings which will wear and therefore not constrain axial movement of the encoding head. The mounting point does not secure and properly align the encoding head so that additional pins are required to align the bracket which wear and misalign. Other prior mounting brackets suffer from the same defects and a number of additional problems which inhibit the head from following a card surface. Many brackets do not pivot freely enough for a head to follow the card surface or pivot too far away from the face of the head so that the head cannot follow the card surface. Other brackets do not constrain the head enough allowing the head to become misaligned in the direction of reading or writing leading to encoder errors. Also, prior mounting brackets are wider than heads, thereby not allowing two heads to be mounted in close proximity to each other.

While transporting the card along the encoder transport path, it is important that the card is not tilted during travel. Prior methods of keeping the card straight used a leaf spring pressing the card upward. However, as a card passes over the end of the spring, the card has uneven pressure applied which does not correct card position as readily as even pressure and such a spring is subject to wear. Prior even pressure devices use a card rail swinging on a pair of supporting arms. The rail provides even pressure to the card along the entire rail, but for keeping the card straight, the arms must be parallel and equal in length. This requires precision parts which will become misaligned with the passage of time. Another problem is undesirable lateral movement of the card caused by excessive play in the arms.

The card must also be properly positioned at the beginning of encoding for encoding information at the correct starting position on the magnetic stripe. Prior methods of set up require a card to be run through an encoder for creating flux changes along the magnetic stripe. The magnetic stripe is then coated with a developer comprising an iron powder and a liquid carrier. The powder enables the flux changes to be studied under a microscope. By viewing through the microscope, the distance from the leading edge of the card to a start sentinel, indicating the starting point on the magnetic stripe for encoding, may be accurately measured. Adjustments for encoding are then made relative to the start sentinel position, and the process is repeated until the desired position is reached. This method is time consuming and requires a developer and a microscope.

The prior methods of setting current levels for writing and amplification levels for reading the magnetic stripe on cards are unsatisfactory. There are no methods for an encoder using a write head and a read head setting its own write current level or read amplification level. The use of the encoder apparatus for current level set up and read amplification level setup eliminates other test equipment such as an oscilloscope and saves time for running tests.

It is evident that a faster, more efficient encoding apparatus is required which is durable and low cost. The present invention solves these and other problems associated with encoding magnetic stripes on plastic cards.

SUMMARY OF THE INVENTION

The present invention relates to an encoding apparatus for encoding information onto a magnetic stripe on a plastic card. The magnetic stripe enables the card to be used for a number of purposes such as for credit operations and for automatic teller machines. According to the present invention, the card is transported along a card transport path having a first end wherein the card enters the transport path and a second end wherein the card exits from the card transport path. As the card is advanced, the magnetic stripe passes an encoding write head. The information is magnetically encoded onto the magnetic stripe as the card passes the head. The card may then pass a read head for verifying the information.

The magnetic encoding apparatus comprises a card carriage for advancing the card along the card transport path. The card transport path is defined by a slotted upper guide and a slotted lower guide wherein the card rides in the slots of the upper and lower guides. One or more magnetic encoding heads mount to the upper or lower guide so that as the card passes, the heads make contact with the magnetic stripe on the card. As the stripe passes, the information is magnetically encoded by the magnetic write head. A second head may be opposed to the encoding head for pressing the magnetic stripe against the write head and may also be an encoding head for encoding information on a stripe opposite the first stripe. If a second encoding head is not used, a dummy head, roller, or the guide slot is required for maintaining contact between the magnetic stripe and the face of the encoding head. A read head may be mounted in a like manner further down the transport path, for verifying that the information encoded on the magnetic stripe is correct.

Sets of write and read heads may be mounted in a number of configurations corresponding to the magnetic stripes on the cards. A number of head configurations are possible depending on a user's needs, including a single head comprising a combination write and read head having two coils, one for writing and one for reading. If combination write and read heads are used, the card must make two passes, one to write and a second to read.

Each head is mounted on a bracket having a peaked cross-section at one end and flaring to a flattened cross-section at a second end which allows the head torsional movement for twisting, and movement toward and away from the card, but resists deflection in all other directions. The bracket engages a peaked spring at the peaked cross-sectional portion of the bracket. The bracket pivots about the spring, which limits the twisting of the bracket by engaging the peaked section. The bracket pivots about a point very near the face of the encoding head for greater control of head deflection so that the face of the head follows the contour of the card and remains aligned with the track being encoded on the card. The bracket may also be shaped so that it includes a channel shaped portion near the encoding head. The channel shape resists deflection as with a peak-shaped bracket and engages the peaked spring so that twisting motion is limited. This ensures that the face of the head maintains good contact with the card if the card is bowed or bent and also ensures that the bracket will not warp or bend.

The encoding apparatus includes two embodiments for different applications and throughput rates. In a first embodiment, the card carriage comprises a carriage body having rotatable pawls at each end of the carriage. Each pawl is resiliently biased to a home position wherein the pawls extend substantially perpendicular to the card transport path and extend into the path so that contact is made with the card. The pawls rotate in a direction toward the second end of the card transport path to a position out of the card transport path and not engaging the card. The carriage mounts on rails parallel to the card transport path so that the carriage is moved to a position wherein the first end of the card carriage extends beyond the entrance at the first end of the card transport path and the carriage is moved to a second position wherein the second end of the card carriage is very near the second end of the card transport path. The pawls pivot toward the second end of the card transport path so that as the carriage moves to the first end of the card transport path, the first pawl engages the leading edge of a card delivered to the encoding apparatus, contacting the edge of the card and rotating out of the way of the card. The carriage moves further toward the first end of the transport path so that the first pawl springs back into the card transport path after passing by the trailing edge of the card.

Upon movement toward the second end of the transport path, the first pawl engages the trailing edge of the card and urges the card along the card transport path. The card passes the write and read encoding heads where information is encoded and verified and is moved to the exit end of the encoding apparatus. The card carriage is then reversed so that the second pawl engages the leading edge of the card and rotates out of the way of the card. As the carriage moves back beyond the trailing edge of the card, the second pawl springs back into the card transport path so that upon forward movement of the carriage, the second pawl pushes the card beyond the encoding apparatus. For disengaging the card, the carriage need not travel back to the entrance position, as prior tilting encoding carriages would, thereby decreasing travel and increasing throughput rate. With this embodiment, no feed rollers are required in the apparatus and the number of moving parts is reduced.

For encoding apparatuses having a single write/read head requiring two passes of the card by the write/read head, the carriage includes a second embodiment having three pawls: a first pawl pivoting toward the exit end of the transport path located at the first end of the carriage; a second pawl rotating toward the entrance end of the transport path located at the second end of the carriage more than a card length away from the first pawl; and a third pawl rotating toward the exit end of the transport path located near the second end of the carriage.

In operation the carriage is moved so that the first and third pawls are rotated back by the card until the first pawl pivots back into the card transport path. It is appreciated that the card is retained between the first and second pawls, so that the carriage retains the card upon movement in either direction. A vane projects upward near the exit of the card transport path and is engaged by the second pawl as the carriage is advanced toward the exit of the card transport path so that the second pawl is rotated out of the card transport path. As the carriage and card are advanced, the second pawl slides along the vane and remains rotated out of the card path. When the carriage is reversed, the second pawl slides along the vane and then on a surface of the card, so that the card is not pulled back by the second pawl. The carriage is moved back so that the third pawl springs into the card transport path behind the card so that upon advancing the carriage, the third pawl pushes the card to an exit position.

Prior encoding apparatuses having a tilting card carriage include tangs which tilt into and out of the card transport path thereby requiring greater carriage travel distance, thereby requiring more travel time for pushing cards out of the apparatus than the second embodiment of the carriage. With the prior apparatuses, the carriage moves to the exit end of the transport path, tilts out of the path, moves to the entrance end, tilts into the transport path and is advanced so that the leading tang pushes the card out the exit.

The bottom rail is rigidly supported and pivotally mounted being urged upward by a spring so that the card is pressed evenly upward. The card is maintained in a straight position by the spring tensioning the bottom rail during transportation through the encoding apparatus.

In a second embodiment of the encoding apparatus, a card carriage comprises a yoke having tangs at the ends of the yoke extending into the card transport path so that a card is retained between the two tangs. The card carriage rides on a leaf spring extending parallel to the card transport path. The card carriage tilts into and out of the card transport path at the entrance and exit of the card transport path respectively and is locked into position along the remainder of the card transport path. A positioning block prevents tilting except at the ends of the card transport path. The card is received at the entrance of the card transport path wherein the carriage is moved to the beginning of the transport path and tilted into the card transport path. The tangs engage the card so that as the carriage is moved, the card is transported along the card transport path and past an encoding write/read head. The write/read head mounts on the same mounting bracket as in the first embodiment. The carriage moves to the exit end of the card transport path whereat the card engages a pair of exit feed rollers for passage out of the apparatus. The carriage is also tilted back so that the tangs disengage the card and the rollers feed the card out of the apparatus. The carriage then moves back to the entrance end of the transport path for receiving the next card.

The encoding apparatus sets several parameters of encoding automatically. A test card is passed by the encoding write head and a start sentinel is placed on the magnetic stripe from default information. The card is then read back and the flux changes are counted from the edge of the card to the start sentinel, thereby determining how close to the edge of the card the start sentinel is. The default value for flux changes is then compared with the number of flux changes actually read from the edge of the card to the start sentinel. If the actual number of flux changes read is too small, the default value is increased by the difference between the default and the actual number of flux changes to obtain an offset value. If the start sentinel is too far from the edge of the card, the default value is decreased by the difference between the number of flux changes read and the default value to obtain the offset value. The distance the carriage is advanced when encoding starts is then adjusted accordingly by the offset value.

Encoding current level is set by writing at a constant flux change per inch density and increasing current level through a selected range over the length of the card as the magnetic stripe of the test card passes the write head. The card is then read back so that corresponding read voltage levels for the current levels are determined. The corresponding voltage and current levels are then compared to acceptable limits. If an acceptable current level is not found, the range of current level is changed and the process is repeated until an acceptable current level is found and set.

Read amplification is set by writing at a constant current level and constant flux change per inch density level. The magnetic stripe is then read and the read voltage is compared to an acceptable range. The amplification is then adjusted so that the voltage falls within an accepted range. Reading back voltage can be used to check for bad cards. If the amplification cannot be adjusted so that the read voltage falls within an acceptable range, the card may have a bad magnetic stripe and a problem is indicated.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings wherein like reference numerals and letters indicate corresponding elements throughout the several views.

DETAILED DESCRIPTION OF THE PREFERRED EMBODIMENTS

Figure 1:
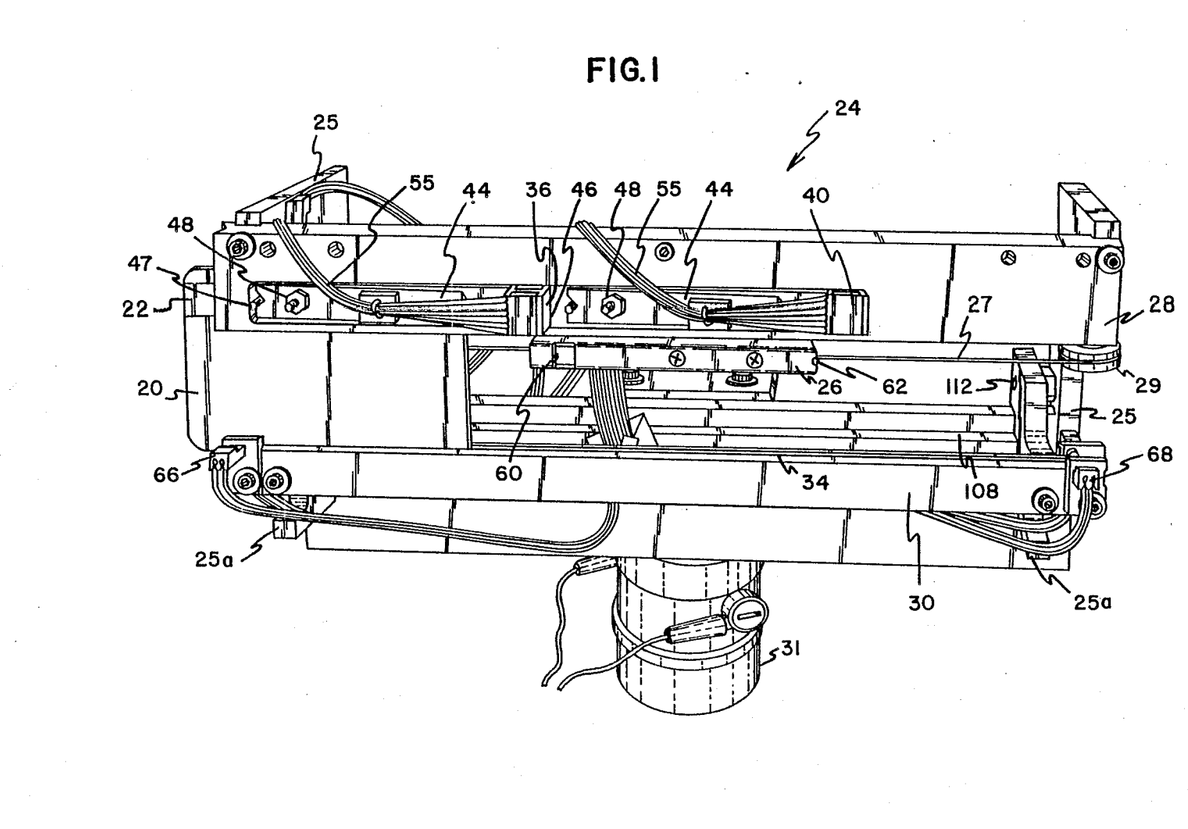
FIG. 1 is a perspective view of an embodiment of a magnetic encoding apparatus according to the principles of the present invention.
Figures 2, 4A:
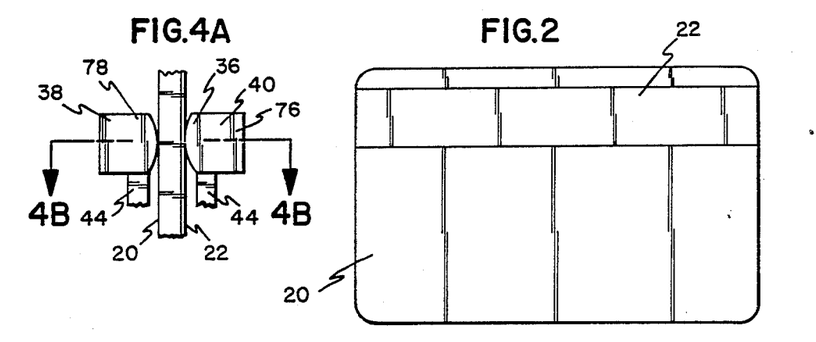
FIG. 2 is an elevational view a plastic card having a magnetic stripe.
FIG. 4A is a top view illustrating the encoding head of FIG. 3 and an associated opposing head contacting the magnetic stripe of a card of FIG. 2.
Figure 22:
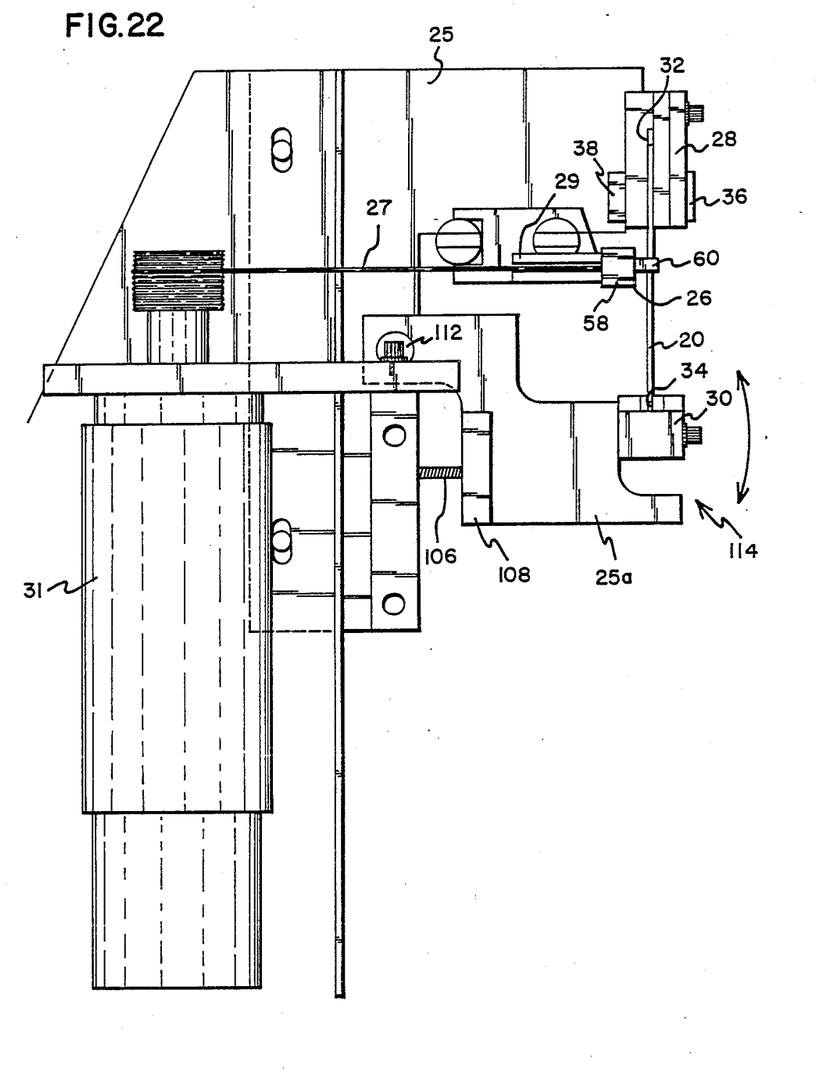
FIG. 22 is a end view of the encoding apparatus shown in FIG. 1.

As shown in FIG. 2, a card 20, such as a credit card or an automated teller machine card, includes a magnetic stripe 22 having information encoded thereon. Information is encoded by passing the card 20 through an encoding apparatus generally shown at 24 of FIG. 1. A card carriage 26 transports the card along a transport path defined by a top rail 28 and a bottom rail 30 supported by a frame 25. As shown in FIG. 22, the card rides along a slot 32 in the top rail 28 and slot 34 in the bottom rail 30.

The carriage 26 is moved along the transport path pulled by a cable 27 winding around pulleys 29 at ends of the transport path. The cable 27 is driven by a motor 31.

Figures 3, 4B, 4C:
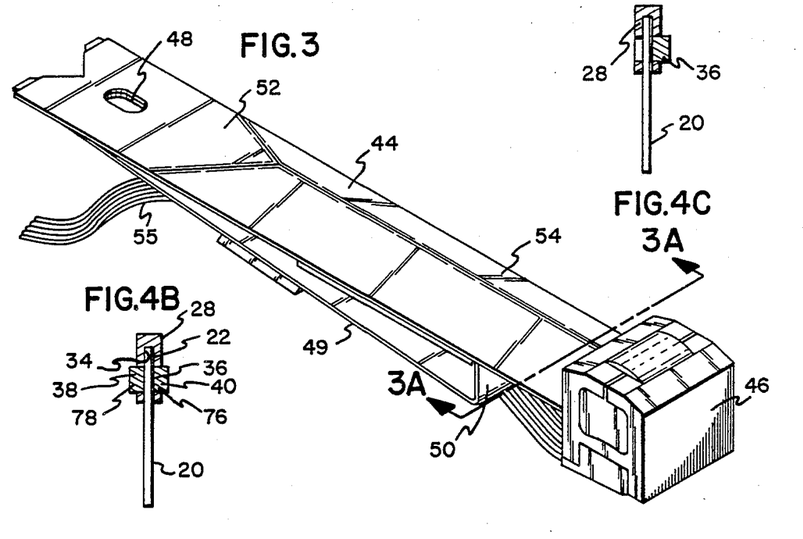
FIG. 3 is a perspective view of a preferred embodiment of an encoding head of the encoding apparatus shown in FIG. 1.
FIG. 4B is a sectional view of the encoding head, opposing head and top rail taken along line B—B of FIG. 4A.
FIG. 4C is a sectional view of the encoding head and top rail of FIG. 4A without an opposing head.

A write head 36 mounts so that it contacts the magnetic stripe 22 as the card 20 is transported along the transport path. An opposing head 38 is used for encoding a magnetic stripe on the opposite side of the card 20 as shown in FIGS. 4A and 4B. If a second stripe is not encoded, the second head 38, which may be a non-encoding dummy head, or other pressing device such as a roller is still required for maintaining contact between the write head 36 and the card magnetic stripe 22. After the card 20 has been transported past the write head 36, the card 20 is transported past a read head 40. As with the write head 36, the read head 40 requires an opposing pressing device for maintaining contact between the read head 40 and the magnetic stripe 22. As shown in FIG. 4C, a pressing device opposing the write head 36 or read head 40 may not be needed as the top rail 28 provides adequate pressure.

Figure 3A:
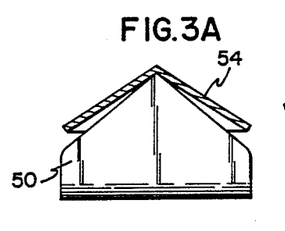
FIG. 3A is a sectional view of the mounting bracket for the encoding head shown in FIG. 3 taken along line A—A of FIG. 3, illustrating the bracket in a non-twisted position.
Figure 3B:
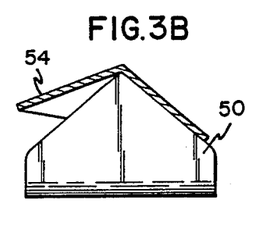
FIG. 3B is a sectional view of the mounting bracket for the encoding head shown in FIG. 3, taken along line A—A of FIG. 3, illustrating the bracket twisting in a clockwise direction.
Figure 3C:
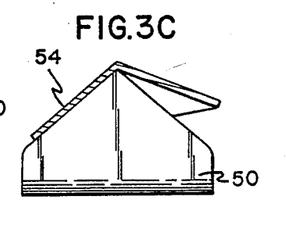
FIG. 3C is a sectional view of the mounting bracket for the encoding head shown in FIG. 3, taken along line A—A of FIG. 3, illustrating the bracket twisting in a counterclockwise direction.

As shown in FIG. 3, the encoding head includes a head portion 46 mounted onto a bracket 44. The bracket includes a mounting portion 48 for attachment to the top rail 28 or bottom rail 30. The bracket 44 includes a peaked section 54 mounting to the head portion 46 which flares to a flattened end section 52 opposite the head portion 46. Information for encoding and reading is communicated to and from the head portion 46 along lines 55. The peaked section 54 encounters a spring 49 having an end peak 50 as shown in FIGS. 3A-3C. The flattened end section 52 allows deflection of the head portion 46 toward and away from the card 20. As shown in FIGS. 3A-3C, the bracket design also provides for movement torsionally to allow for twisting action of the head portion 46, so that contact is maintained with the magnetic stripe 22. The mounting bracket 44 resists deflection in all other directions so that the head portion 46 urged by the spring 49 in the direction of the card 20 follows the contour of a card surface and maintains contact with the magnetic stripe 22.

Figure 18:
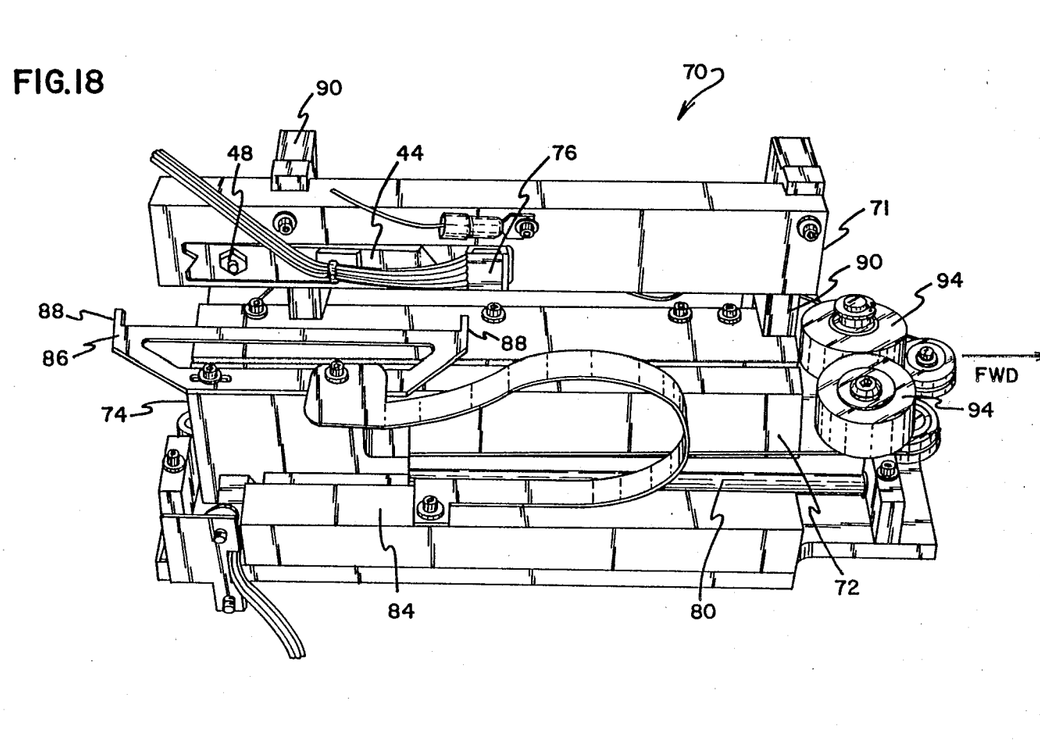
FIG. 18 is a perspective view of a second embodiment of an encoding apparatus in accordance with the principles of the present invention.

The mounting bracket 44 attaches to the encoding apparatus 24 at a single point 48 as shown in FIGS. 1 and 18. As shown in FIG. 1, the bracket 44 is aligned by a single pin 47 engaging a notch in the flattened end section 52.

As shown in FIGS. 3, 3A-3C and 4A, the mounting bracket 44 pivots about the tip of the end peak 50. This point is close to the face of the head portion 46, providing for better twisting action so as to follow a card surface more closely.

Figure 11:
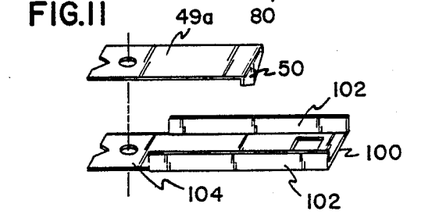
FIG. 11 is a perspective view of a second of an encoding head mounting bracket according to the principles of the present invention.
Figure 12:
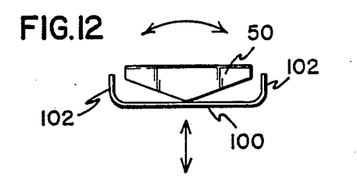
FIG. 12 is an end view of the mounting bracket shown in FIG. 11.
Figure 13:
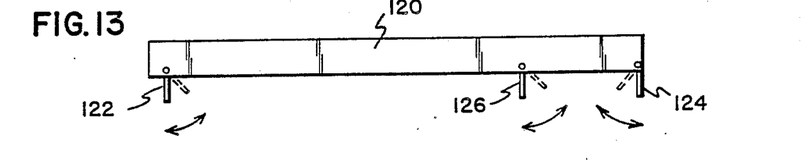
FIG. 13 is a top view of a second embodiment of a card carriage having three pawls, in accordance with the principles of the present invention.

A second embodiment of a mounting bracket is shown in FIGS. 11 and 12. The mounting bracket 100 has a channel cross-section. The mounting bracket 100 engages a spring 49a having an end peak 50 as in the first embodiment. The bracket 100 pivots upon end peak 50 providing for twisting action. The flattened end section 104 allows deflection toward and away from the card surface. Bracket side portions 102 extend partially along the bracket 100 and provide resistance to deflection in undesired directions. The side portions 102 also engage the edges of the spring 49a to limit twisting motion within a desirable range.

As shown in FIGS. 1 and 22, the card 20 is supported along the entire card transport path by bottom rail 30. The bottom rail 30 is supported at each end by lower frame portions 25a. A lengthwise support 108 connects to the lower frame portions 25a to provide rigidity for a lower support unit 144. The lower support unit 144 pivotally attaches to the frame 25 at pivots 112 at both ends of the lower support unit 144. A compression spring 106 between the frame 25 and the lower support unit 144 provides for upward pressure against the bottom of the card 20 by the bottom rail 30 along the entire card transport path. In this manner, the card 20 is kept aligned for proper encoding.

Figure 7:
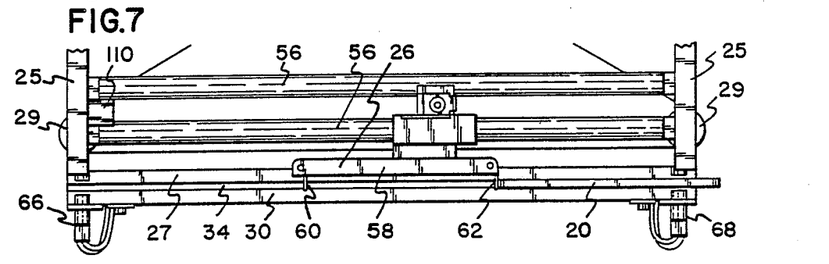
FIG. 7 is a top view of the encoding apparatus shown in FIG. 1 taken below the top rail, illustrating the card carriage backed up from the position shown in FIG. 6, so that the second pawl is sprung back into the card transport path.
Figure 8:
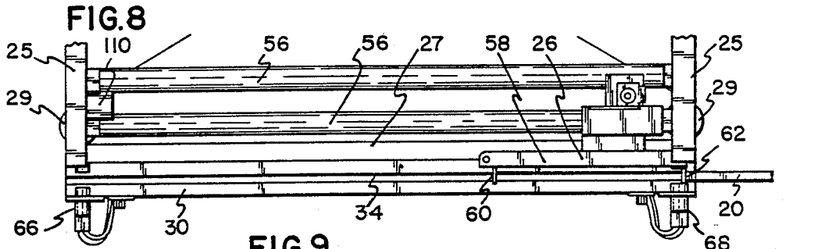
FIG. 8 is a top view of the encoding apparatus shown in FIG. 1 taken below the top rail, illustrating the card carriage second pawl pushing the card out the exit end of the encoding apparatus.
Figure 9:
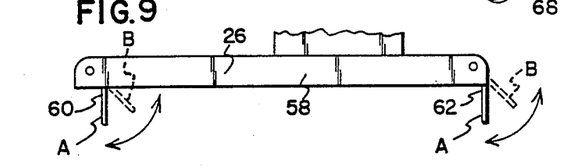
FIG. 9 is a top view of the card carriage of the encoding apparatus shown in FIG. 1, illustrating the pawls in an extended position and a retracted position.

As shown in FIGS. 5-8, the carriage 26 slides along shafts 56 running parallel to the transport path. As shown in FIG. 9, the carriage 26 comprises a body 58 having a first pawl 60 and a second pawl 62. The resiliently biased pawls 60 and 62 protrude perpendicularly from the carriage body 58 and into the card transport path as shown at A. The pawls 60, 62 are mounted for rotating away from the card transport path in a direction toward the exit end of the card transport path. The pawls 60 and 62 engage the card 20 and rotate to a retracted position out of the card transport path as shown at B.

Figure 5:
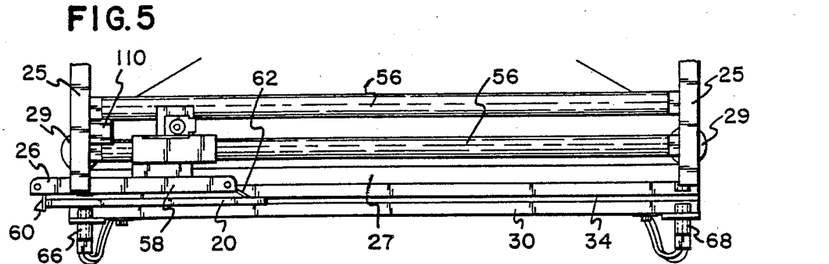
FIG. 5 is a top view of the encoding apparatus shown in FIG. 1 taken below the top rail, illustrating the card carriage in a card pick-up position.

As shown in FIGS. 5-8, the card 20 delivered to the encoding apparatus 24 passes a photocell 66 at the entrance end of the card transport path. The carriage 26 is then moved toward the card 20 until the first pawl 60 engages the leading edge of the card 20. As the carriage 26 moves toward the entrance of the card transport path, the first pawl 60 is pushed away from the card 20 so that the first pawl 60 rotates out of the card transport path until the card carriage 26 has moved beyond the trailing edge of the card 20. The first pawl 60 is resiliently biased so that it springs back to a position perpendicular to the carriage body 58 and into the card transport path, as shown in FIG. 5. Upon forward movement of the card carriage 26, the first pawl 60 engages the trailing edge of the card 20 and advances the card 20 along the transport path.

The card 20 is transported so that the magnetic stripe 22 contacts and passes the write head 36, as shown in FIG. 4A. As the card 20 passes the write head 36, information is communicated to the write head 36 by lines 55 and encoded onto the magnetic stripe 22. An opposing head 38 may be used to write on a magnetic stripe on the opposite side of the card 20 and to provide pressure against the opposite side of the card 20 to maintain good contact between the write head 36 and the magnetic stripe 22. The opposing head 38 may be a dummy head used only for applying pressure against the card 20. In a similar manner, the card 20 is transported past the read head 40 located further along the card transport path having an opposing head 38 as in FIG. 4A for verifying the magnetic encoding.

Figure 6:
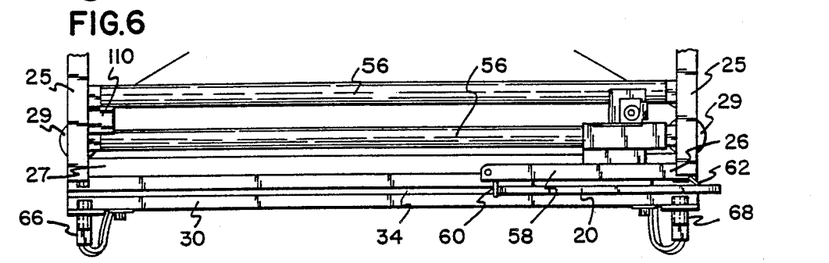
FIG. 6 is a top view of the encoding apparatus shown in FIG. 1 taken below the top rail, illustrating the first pawl pushing the card to the exit end of the card transport path.

After the card 20 has been transported past the write head 36 and read head 40, the card 20 is moved to the exit end of the card transport path, as shown in FIG. 6. The card carriage 26 is reversed so that the second pawl 62 is moved back beyond the trailing edge of the card 20, as shown in FIG. 7. The second pawl 62 is resiliently biased so that the second pawl 62 returns to a perpendicular position protruding into the card transport path so that upon movement toward the exit end of the card transport path of the card carriage 26, the second pawl 62 engages and pushes the card 20 toward the exit end of the card transport path. The card carriage 26 is advanced as shown in FIG. 8 so that the card 20 is pushed to an exit position of the encoding apparatus 24 while a photocell 68 detects passage of the card 20.

A second embodiment of a card carriage is shown in FIGS. 13-17. The carriage 120 includes a first rotatable pawl 122 located at a first end of the carriage 120 resiliently biased into the card transport path and rotating out of the card transport path toward the second end of the carriage 120. A second rotatable pawl 124 is located at the second end of the carriage 120 resiliently biased into the card transport path and rotating out of the card transport path toward the first end of the carriage 120. A third rotatable pawl 126 is located between the first pawl 122 and second pawl 124 nearer the second end of the carriage 120 resiliently biased into the card transport path and rotating out of the card transport path toward the second end of the carriage 120. The first pawl 122 is located at least a card length away from the position of the second pawl 124 when the second pawl 124 is rotated out of the card transport path.

Figure 14:
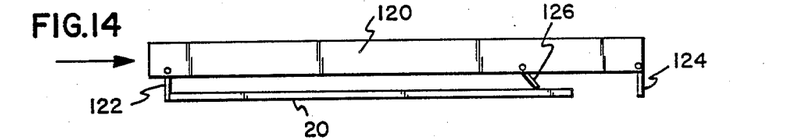
FIG. 14 is a top view of the card carriage shown in FIG. 13, wherein a card is retained between the end pawls.

As shown in FIG. 14, a card 20 is retained between the first pawl 122 and the second pawl 124 while the third pawl 126 engages the card 20 and is rotated out of the card transport path. The carriage 120 may be moved forward or back and the card 20 will remain retained between the first pawl 122 and the second pawl 124.

Figure 15:
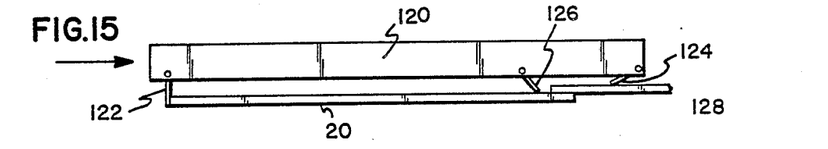
FIG. 15 is a top view of the card carriage shown in FIG. 13, wherein a vane is projected into the card transport path, engaging the pawl at the leading edge of the carriage.
Figure 16:
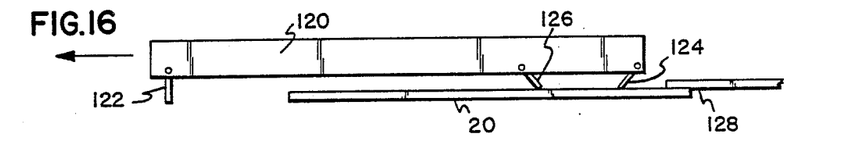
FIG. 16 is a top view of the card carriage shown in FIG. 13, wherein the carriage has backed up from the position shown in FIG. 15, so that the pawl at the leading edge of the carriage engages the card and does not spring into the card transport path.

For exiting the card 20, the carriage 120 is advanced as shown in FIG. 15 so that the second pawl 124 engages a vane 128 and is rotated out of the card transport path. The vane 128 keeps the second pawl 124 retracted while the carriage 120 is advanced so that, as shown in FIG. 16, upon reversing the carriage 120, the second pawl 124 slides along a surface of the card 20 and does not rotate into the card transport path. The card 20 is no longer retained by the second pawl 124. The second pawl 124 is lower than the third pawl 126, so that the second pawl 124 will engage the vane 128 while the third pawl 126 passes above the vane 128.

Figure 17:
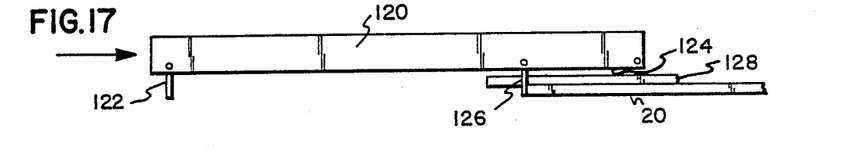
FIG. 17 is a top view of the card carriage shown in FIG. 13, wherein the vane is retracted and the carriage has backed up from the position shown in FIG. 16 so that the middle pawl rotates into the card transport path and engages the trailing edge of the card.

As shown in FIG. 17, the carriage 120 has been moved so that the third pawl 126 has moved beyond the trailing edge of the card 20 and sprung back into the card transport path. Upon advancement of the carriage 120, the third pawl 126 engages the trailing edge of the card 20 and pushes the card 20 to the exit position of the encoding apparatus 24.

As shown in FIG. 22, the cable 27 attaches to carriage 26 at the carriage body 58. It will be appreciated that the drive point on the carriage body 58 is very close to the point of contact between the card 20 and the pawl 60. The contact points are aligned in the same horizontal plane so that very little torque is developed about the carriage 26, which decreases strain and wear.

ALTERNATE EMBODIMENT

Figure 21:
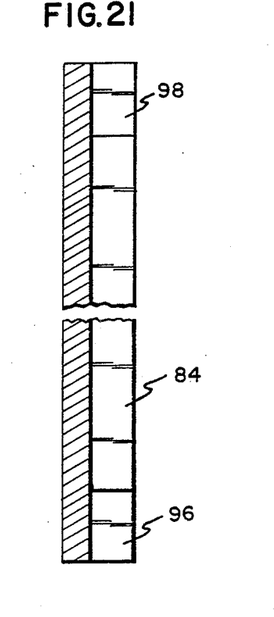
FIG. 21 is a sectional view of a retaining block taken along line A—A in FIG. 19, illustrating the end portions whereat the carriage may tilt.

When lower throughput rates are required, a second embodiment as shown in FIG. 18 is generally used. The second embodiment of an encoding apparatus 70 comprises a slotted top rail 71 and slotted bottom rail 72 defining a card transport path similar to the first embodiment. A card carriage 74 rotates into the card transport path for advancing the card 20 along the path. A write/read head 76 mounts on a bracket 44 identical to the first embodiment for the write head 36 and the read head 40, as shown in FIGS. 3 and 18 and requires an opposing pressing device (not shown) for maintaining contact with the card 20. The write/read head 76 writes information onto the magnetic stripe 22 during the first forward pass of the card 20. The card carriage 74 is then reversed and moved back beyond the write/read head 76. The information is verified by the head 76 during a second forward pass of the card 20 past the head 76. The head 76 contains a read coil and a write coil so that the head 76 performs both write and read functions. Alternatively the same coil may be used for both write and read functions. The card carriage 74 slides along a shaft 80 having tilting means for rotating the card carriage 74 into the card transport path and out of the card transport path for engaging and releasing the card 20. The tilting of the card carriage 74 is restricted by a retaining block 84 shown in FIG. 21 which permits rotation of the carriage 74 only at the entrance and exit ends of the card transport path.

The carriage 74 includes a carriage body 86 having a pair of tangs 88 protruding beyond the rest of the carriage body. The tangs 88 are spaced at least a card length apart, so that a card 20 is engaged between the tangs 88.

Figure 19:
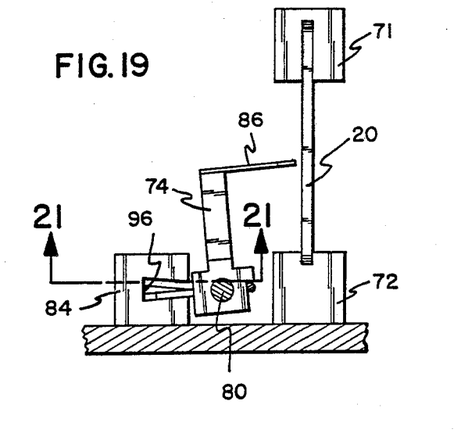
FIG. 19 is an end view of the encoding apparatus shown in FIG. 18, illustrating the card carriage in a position tilted away from the card transport path.
Figure 20:
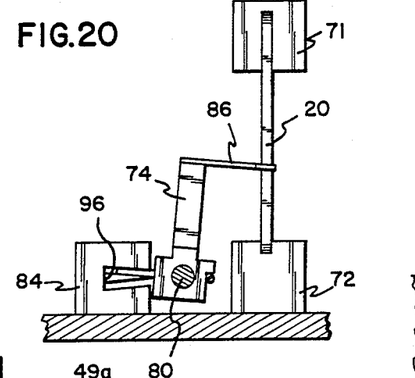
FIG. 20 is an end view of the encoding apparatus shown in FIG. 18, illustrating the card carriage in a position tilted into the card transport path and engaging a card.

The card 20 is delivered into the transport path whereat the carriage 74 is tilted into an engaging position as shown in FIG. 20. The card 20 is advanced to the exit end of the card transport path, so that the card 20 engages the exit rollers 94. As the carriage 74 is further advanced to the exit end of the card transport path, the card 20 is released by the carriage 74 as shown in FIG. 19. The card block 84 has reliefs 98,96 at the entrance and exit ends of the card transport path, respectively, allowing rotation of the card carriage 74 into and out of the transport path for engaging and releasing the card 20.

In operation, the card 20 is received at the entrance end of the card transport path whereupon the card carriage 74 is moved to the entrance end and rotated into the card transport path so that the tangs 88 encompass the leading and trailing edges of card 20. The card carriage 74 is then advanced passed the write and read head 76. The information is magnetically encoded onto the magnetic stripe 22 during this first forward pass. The card carriage 74 is then reversed so that the card 20 passes back beyond the write and read head 76. The carriage 74 is then advanced past the head 76 a second time reading back and verifying the encoded information. After the second pass forward, the card carriage 74 advances to the exit end of the card transport path. The carriage 74 is advanced until the exit rollers 94 engage the card 20. The card carriage 74 is then tilted back releasing the card 20, so that the rollers 94 deliver the card 20 out of the apparatus. It will be appreciated that the reading and verifying of the encoded information could have taken place during the reverse movement of the carriage 74.

AUTOMATIC SET UP

Figure 10:
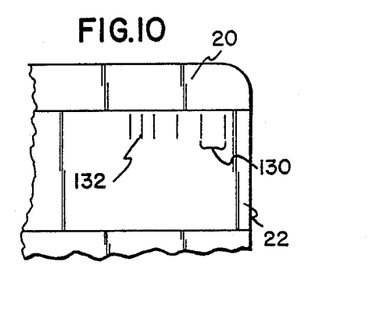
FIG. 10 is a detail of the card and magnetic stripe shown in FIG. 2, illustrating flux changes and a start sentinel.
Figure 24:
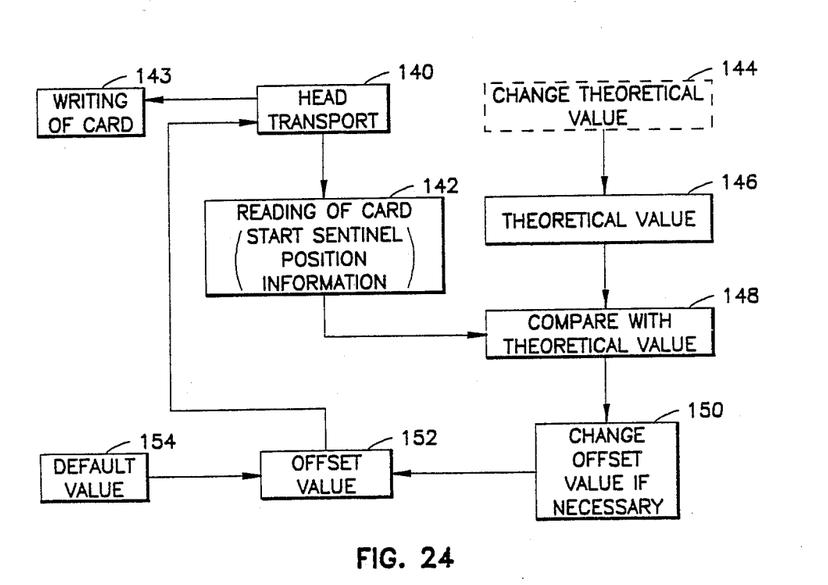
FIG. 24 i/s a block diagram of a method of setting an encoding apparatus for beginning encoding at the correct starting location on a magnetic stripe according to the principles of the present invention.

The present invention can be used for automatically setting several encoding parameters. As shown in FIGS. 10 and 24, a method is shown for adjusting the starting position for encoding on the magnetic stripe 22. As shown in FIG. 10, a magnetic stripe 22 is encoded so that flux changes 130 are placed on the stripe 22; a start sentinel 132 is also placed on the magnetic stripe 22, in FIG. 24 at 142. As shown in FIG. 24, the number of flux changes 130 from the edge of the card 20 to the start sentinel 132 is taken from an offset value 152 and encoded at 143 onto the magnetic stripe 22 by the head/transport 140. A default value 154 becomes the offset value 152 if no offset value 152 yet exists. The magnetic stripe 22 is read back and the actual number of flux changes 130 from the edge of the card 20 to the start sentinel 132, value 142, is compared to the theoretical value 146 as seen at 148. If the position is correct the present offset value 152 is used for subsequent encoding. If the start sentinel 132 is in the wrong position relative to the edge of the card 20, the offset value 152 is changed as at 150 by the difference between the theoretical value of flux changes to the start sentinel 146 and the value read 142. The offset value 152 is used in cooperation with an actual position reference determined by the carriage 26 passing a photocell 110 shown in FIGS. 5-8. In this way the encoding is begun at the correct starting position on the magnetic stripe 22 for all subsequent cards 20. It can be appreciated that the start sentinel position on the card 20 can be moved by changing the theoretical value at 144 and repeating the steps outlined above.

Figure 23:
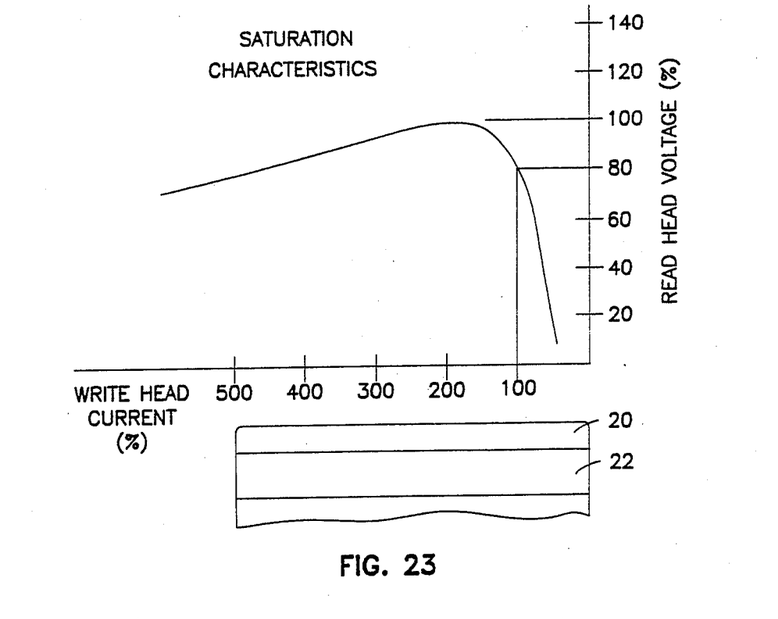
FIG. 23 is a plot of typical voltage values versus write current levels for an encoding write head and illustrating typical acceptable limits.
Figure 25:
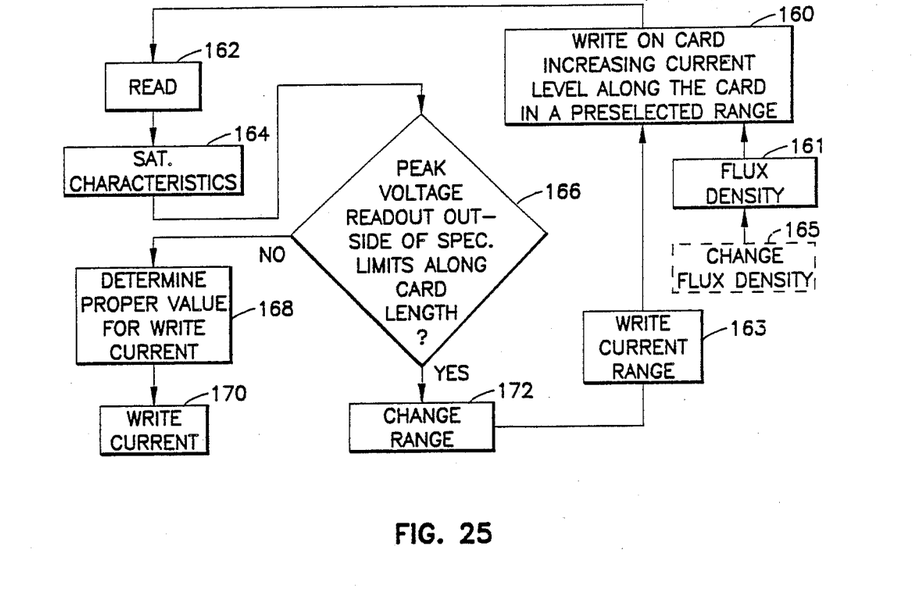
FIG. 25 is a block diagram of a method of setting write current levels with an encoding apparatus according to the principles of the present invention.

The current level for writing on the magnetic stripe 22 can be set as shown in FIG. 25. A magnetic stripe 22 is written at a predetermined flux change per inch density 161 so that the current level applied to the write head is increased along the length of the magnetic stripe 22 in step 160 at the range 163 specified. During reading of the same magnetic stripe 22, the read back voltage level from the read head increases rapidly to a peak value at some point along the length of the magnetic stripe 22 as shown in FIG. 23. After the voltage level peaks, it gradually decreases. It is desirable to use write currents corresponding to read voltage values which are to the left of the peak shown in FIG. 23 in the gradually decreasing portion of the plot.

During operation the card 20 is written at step 160, then read at step 162 and the saturation characteristics 164 are compared at step 166 of FIG. 25. If the peak read voltage level occurs at a position on the card 20 which is within specified limits at step 166, the write current level is determined at step 168 of FIG. 25 and the write current level is set at step 170. If the peak read voltage level occurs at a position which is outside the specified limits at step 166, the range 163 for varying the write current level is changed at step 172 and the process is repeated until an acceptable write current level is found.

Figure 26:
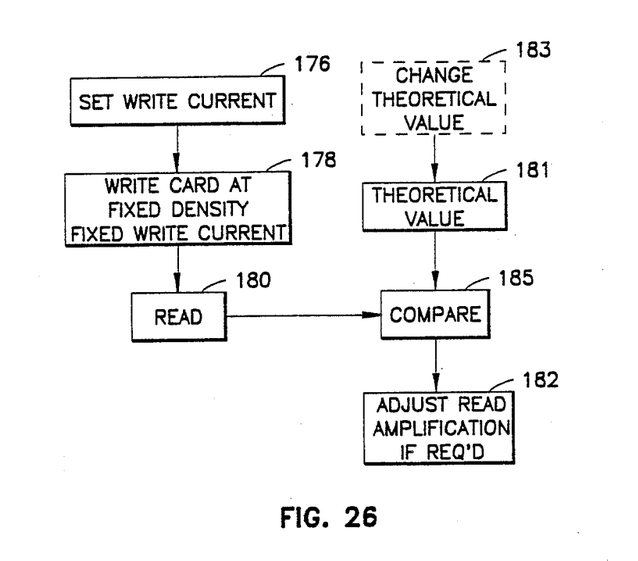
FIG. 26 is a block diagram of a method of adjusting read amplification and checking magnetic stripe acceptability with an encoding apparatus according to the principles of the present invention.

As shown in FIG. 26, amplification for reading may be automatically set. After the write current is set at step 176, using the method shown in FIG. 25 or any other suitable method, a magnetic stripe is written on at a constant current and constant flux change per inch density at step 178 of FIG. 26. The encoding is then read back at step 180, compared at 185 to a theoretical value 181 and the amplification is adjusted to be equal to the theoretical value 181 at step 182 if required. Step 182 may be performed as the card is read, making adjustments as the magnetic stripe 22 passes by the read head, or may be computed after the card is finished being read. If the amplification cannot be adjusted to an acceptable level in step 182, a problem is indicated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A magnetic encoding apparatus for encoding information onto a magnetic stripe on a card, comprising:
    (a) a supporting frame;
    (b) slotted top and bottom rails mounted on the frame defining a card transport path;
    (c) an encoding head located adjacent the card transport path so that contact is made between the card magnetic stripe and the encoding head as the card passes through the card transport path, the encoding head being mounted on a bracket, the bracket having a peak shaped cross-section at one end of the bracket adjacent the encoding head, the bracket flaring to a substantially planar cross-section at the end of the bracket opposite from the encoding head, the bracket being biased by a spring member having a peaked shape end member engaging the peaked shape portion of the mounting bracket, biasing the bracket toward the card transport path, the encoding head being pivotally supported by the spring member so that the encoding head can pivot relative to the card transport path;
    (d) a card carriage slidably mounted on a shaft extending parallel to the card transport path and being engageable with the card on the card transport path, the card carriage tilting away from the card path for disengaging the card; and (e) card carriage motive means for moving the carriage along the card transport path.

2. An apparatus according to claim 1, wherein the card carriage motive means comprises a cable and pulley system for transporting the card carriage.

3. An apparatus according to claim 1, wherein the card carriage comprises a yoke having tangs at both ends of the yoke for retaining a card between the tangs.

4. An apparatus according to claim 1, further including tilt limiting means for preventing tilting of the card carriage except at the ends of the card transport path.

5. An apparatus according to claim 4, wherein the tilt limiting means comprises a block extending parallel to the shaft, the block abutting the card carriage along the transport path, the block having a notch at the entrance and exit ends of the transport path so that the block does not abut the carriage at the entrance and exit ends.

6. A card transport system for transporting a card along a card transport path comprising:
a top card rail defining an upper limit of the card transport path;
a bottom card rail defining a lower limit of the card transport path; and
a card carriage including a first pawl and a second pawl, the first pawl and second pawl are resiliently biased into the card transport path and rotate out of the card transport path toward the exit end of the card transport path so that as the card carriage is backed up beyond the card, the first pawl rotates out of the way of the card until passing beyond the entrance end of the card, whereat the first pawl springs back into the card transport path and engages the card upon moving the carriage toward the exit end of the card transport path, the second pawl is located at the exit end of the carriage so that upon backing the carriage so that the second pawl contacts the exit end of the card, the second pawl rotates out of the way of the card, and upon backing the second pawl past the card transport path entrance end of the card, the second pawl springs back into the plane of the card transport path, so that upon advancing the carriage, the second pawl engages the entrance end of the card.

7. An apparatus according to claim 6, wherein the card carriage slides along a shaft extending parallel to the top rail and bottom rail.

8. An apparatus according to claim 6, further including motive means for moving the carriage along the card transport path.

9. A card transport system for transporting a card along a card transport path defined by a top rail and a bottom rail comprising:
a card carriage;
a card carriage shaft extending parallel to the card transport path, guiding the card carriage;
motive means for sliding the card carriage along the shaft, thereby moving the card along the card transport path;
wherein the card carriage includes a first pawl at the front end of the carriage, and a second pawl at the rear end of the carriage, the first and second pawls extending into the card transport path and rotating toward the front end of the carriage to a position substantially parallel to the card transport path, wherein the pawls are resiliently biased toward extending into the card transport path so that upon engaging a card at the card's front end, the pawls rotate out of the way of the card and whereupon passing beyond a rear end of the card, the pawls spring into the card transport path and engage the rear end of the card upon advancement of the card carriage.

10. An apparatus according to claim 9, wherein the pawls are biased toward a position extending into the card transport path.

11. A magnetic encoding apparatus for encoding information onto a magnetic stripe on a card, comprising:
(a) a supporting frame;
(b) slotted top and bottom rails mounted on the frame defining a card transport path;
(c) an encoding head located adjacent the card transport path so that contact is made between the card magnetic stripe and the encoding head as the card passes through the card transport path;
(d) a card carriage including a first pawl at the front end of the carriage, and a second pawl at the rear end of the carriage, the first and second pawls extending into the card transport path and rotating toward the front end of the carriage to a position substantially parallel to the card transport path, wherein the pawls are resiliently biased toward extending into the card transport path so that upon engaging a card at the card's front end, the pawls rotate out of the way of the card and whereupon passing beyond a rear end of the card, the pawls spring into the card transport path and engage the rear end of the card upon advancement of the card carriage;
(e) a card carriage shaft extending parallel to the card transport path, guiding the card carriage; and
(f) motive means for sliding the card carriage along the shaft, thereby moving the card along the card transport path.

12. An apparatus according to claim 11, including a head opposing the encoding head for pressing the magnetic stripe against the encoding head.

13. An apparatus according to claim 11, further including a read head located along the transport path so that contact is made between the card magnetic stripe and the read head as the card passes for verifying encoded information.

14. An apparatus according to claim 11, wherein the encoding head mounts on a bracket having a peaked cross-section at the end nearest the encoding head and flaring to a substantially planar end opposite the encoding head, providing for twisting motion of the head and movement of the head toward and away from the card for following the contour of the card but resisting deflection in all other directions.

15. An apparatus according to claim 14, wherein the bracket further includes a spring having a peaked shape end member engaging the peaked section of the bracket, for limiting twisting and deflection of the bracket.

16. An encoding head and bracket apparatus for encoding information onto a magnetic stripe of a card in a magnetic encoding apparatus, comprising:
an encoding head;
a mounting bracket attached at one end to the encoding head, the bracket having a peak shaped cross-section at the end of the bracket adjacent the encoding head, the bracket flaring to a substantially planar cross-section at the end opposite the encoding head; and a spring having a peaked shape end portion engaging the peak shaped cross-section of the mounting bracket so that the bracket pivots about the peaked shape end portion of the spring.

17. An apparatus according to claim 16, further including a pressing device opposing the encoding head for pressing the magnetic stripe against the encoding head.

18. An apparatus according to claim 16, wherein the pressing device comprises an encoding head for encoding information onto a magnetic stripe on a second side of the card.

19. A method for setting the beginning encoding position for encoding a magnetic stripe on a card with encoding means by moving the magnetic stripe relative to an encoding head, the magnetic stripe having flux changes and a start sentinel for positioning a starting position of encoding so that the encoding means begins encoding information at a correct position on the magnetic stripe, comprising the steps of:

(a) moving the magnetic stripe relative to the encoding head so that the magnetic stripe is encoded and the start sentinel is placed on the magnetic stripe;

(b) moving the magnetic stripe relative to an encoding read head so that the magnetic stripe is read;

(c) measuring the position of the start sentinel relative to the edge of the card with the encoding means;

(d) comparing the actual distance from the edge of the card to the start sentinel to a theoretical distance;

(e) subtracting the theoretical distance from the actual distance in order to obtain a new offset number; and (f) adjusting the beginning encoding position by the offset number.

20. A method of setting a current level for writing information onto a magnetic stripe on a card with an encoding write head, comprising the steps of:

(a) writing at a constant flux change per inch density while increasing the write current in a preselected range as the stripe passes the write head;

(b) reading the magnetic stripe with a read head;

(c) comparing voltage levels and current levels within an accepted range;

(d) if a current value is found which falls within the accepted range, selecting a current level falling within the accepted range; and (e) if no current value is found which falls within the accepted range, changing the preselected range of step (a) and repeating steps (a) through (e).

21. A method of adjusting read amplification in encoding means, having a write means and a read means, and a preset write current comprising the steps of:

(a) writing on a magnetic stripe at a fixed write current and a fixed flux change per inch density; and (b) reading the magnetic stripe, comparing read voltage levels to a theoretical level, and adjusting the read amplification to equal the theoretical level.

22. A method according to claim 21, wherein the read amplification is set by averaging values along the card and then changing the read voltage level if required.

23. A method according to claim 21, wherein the read amplification is adjusted as the magnetic stripe is read.

24. A method according to claim 21, wherein a problem is indicated if the amplification cannot be adjusted to fall within an accepted range.

25. A card carriage for transporting a card along a card transport path defined by an upper guide and a lower guide comprising:

(a) a carriage body having a first end nearer the entrance end of the transport path and a second end of the carriage nearer the exit end of the transport;

(b) a first pawl resiliently biased into the card transport path and rotatable out of the transport path toward the second end of the carriage;

(c) a second pawl located at the second end of the carriage and resiliently biased into the card transport path and rotatable out of the card transport path toward the first end of the carriage, the second pawl at least a card length away from the first pawl, so that upon rotating the second pawl out of the card transport path, the second pawl does not contact a card retained in the carriage; and (d) a third pawl located proximate to the second end of the carriage resiliently biased into the card transport path and rotatable out of the card transport path toward the second end of the carriage.

26. A card transport system for transporting a card along a card transport path having an entrance end and an exit end, comprising:

(a) a slotted top guide receiving the top edge of the card defining an upper limit of the card transport path;

(b) a slotted bottom guide receiving the bottom edge of the card defining a lower limit of the card transport path;

(c) a card carriage including:

(i) a carriage body having a first end nearer the entrance end of the transport path and a second end of the carriage nearer the exit end of the transport;

(ii) a first pawl resiliently biased into the card transport path and rotatable out of the transport path toward the second end of the carriage;

(iii) a second pawl located at the second end of the carriage and resiliently biased into the card transport path and rotatable out of the card transport path toward the first end of the carriage, the second pawl at least a card length away from the first pawl, so that upon rotating the second pawl out of the card transport path, the second pawl does not contact a card retained in the carriage; and (iv) a third pawl located proximate to the second end of the carriage resiliently biased into the card transport path and rotatable out of the card transport path toward the second end of the carriage; and (d) a vane mounted in the bottom guide, the vane positioned so that the second pawl engages the vane and rotates out of the card transport path.

27. An encoding head bracket apparatus for restricting movement of a head in all directions except for twisting about an axis parallel to a card transport path, and in a lateral direction toward and away from the card transport path, comprising:

(a) a mounting member having a peak-shaped cross-section at a first end of the mounting member mounting to the head, the peak-shaped cross-section portion flaring to a substantially planar portion at a second end opposite the first end;

(b) attachment means near the second end of the mounting member;

(c) alignment means at the second end of the mounting member; and
(d) a spring attached to the second end of the mounting member extending along and below the mounting member, the spring having a peaked portion extending up near the first end of the mounting member, the peaked portion engaging the peak-shaped cross-section portion of the mounting member so that the mounting member pivots about the peaked portion of the spring.

* * * * *